United States Patent [19]

Clarke

[11] 4,345,268
[45] Aug. 17, 1982

[54] PROCESSING CIRCUIT FOR COLOR TELEVISION SIGNALS

[75] Inventor: Christopher K. P. Clarke, Crawley, England

[73] Assignee: British Broadcasting Corporation, London, England

[21] Appl. No.: 228,547

[22] Filed: Jan. 26, 1981

Related U.S. Application Data

[63] Continuation of Ser. No. 24,519, Mar. 28, 1979, abandoned.

[30] Foreign Application Priority Data

Mar. 29, 1978 [GB] United Kingdom ............... 12294/78

[51] Int. Cl.³ ............................................ H04N 9/535
[52] U.S. Cl. ..................................................... 358/31
[58] Field of Search ................... 358/21 R, 31, 37, 40

[56] References Cited

U.S. PATENT DOCUMENTS

| 3,858,240 | 12/1974 | Golding | 358/31 |
| 4,056,516 | 9/1977 | Weston | 358/31 |
| 4,143,396 | 3/1979 | Mackenzie | 358/31 |
| 4,178,609 | 12/1979 | Beutel | 358/31 |
| 4,200,881 | 4/1980 | Carnt | 358/31 |
| 4,219,842 | 8/1980 | Miller | 358/31 |
| 4,241,363 | 12/1980 | Maeyama | 358/31 |

FOREIGN PATENT DOCUMENTS

| 1941848 | 3/1971 | Fed. Rep. of Germany | 358/31 |
| 1333887 | 10/1973 | United Kingdom | 358/31 |
| 1431378 | 4/1976 | United Kingdom | 358/31 |
| 2003695 | 3/1979 | United Kingdom | 358/31 |

OTHER PUBLICATIONS

Barton, "A Practical CCD Filter for Separation of Luminance and Chrominance Signals in a TV Receiver", IEEE Trans on Cons Elec. vol. 23, No. 3, 8–77.
Rossi "Digital TV Comb Filter with Adaptive Features", Proceedings of the Conf. Video and Data, Birmingham England, 20–22 Jul. 1976 pp. 267–282.
Metzger "Comb. Filter", Research Disclosure, No. 153, pp. 34–35 Jan. 1977, 358-31.
Golding, "Frequency Interleaved Sampling of a Color Television Signal", IEEE Trans. on Communication Tech. vol.–com-19, No. 6, Dec. 1971.

Primary Examiner—Michael A. Masinick
Attorney, Agent, or Firm—Robert F. O'Connell

[57] ABSTRACT

A signal processing circuit (10) for color television signals, e.g. PAL signals, has first and second one-line delays (14, 16) connected in series to the input (12), an averager (18) connected across the two delays and a subtractor (20) connected to subtract the averager output from the output of the first delay (14). In this way the circuit provides (i) a first signal at the output of the first delay (14) which is the input signal delayed by one line period and (ii) a second signal at the output of the subtractor (20) which is the resultant of the average of the undelayed input signal and the input signal delayed by two line periods subtracted from the input signal. A band-pass filter (22) covering the chrominance band is connected to the output of the subtractor (20). A second subtractor (24) subtracts the filtered signal from the one-line delayed signal. Separated luminance and chrominance are obtained at the outputs of the second subtractor (24) and the filter (22) respectively, which are especially suitable for line-locked sampling frequencies. Either output may be used on its own. For N.T.S.C. signals, a divide-by-two circuit is included in series with the band-pass filter (22).

7 Claims, 4 Drawing Figures

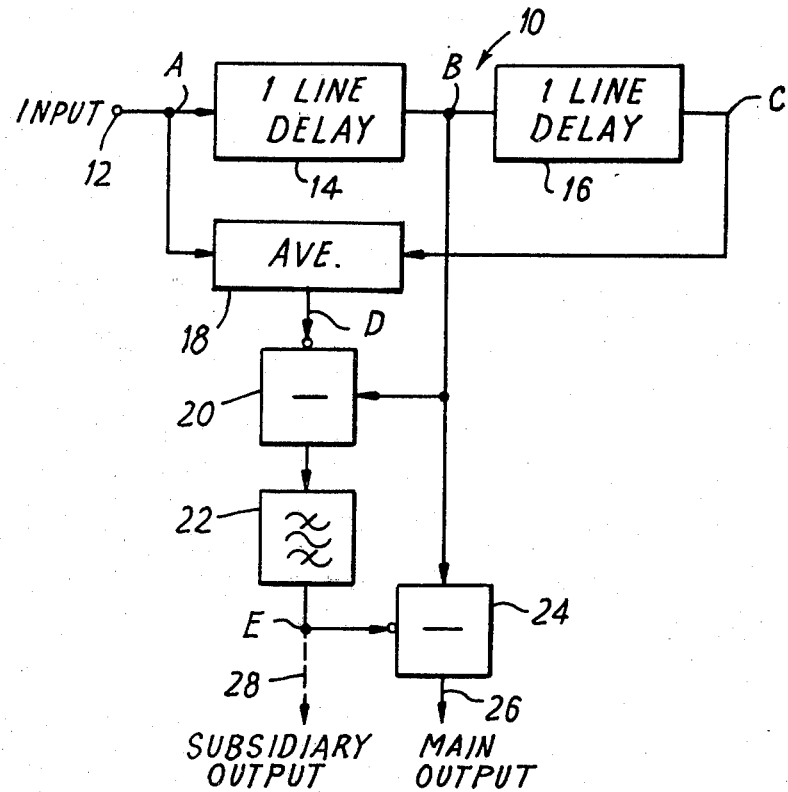
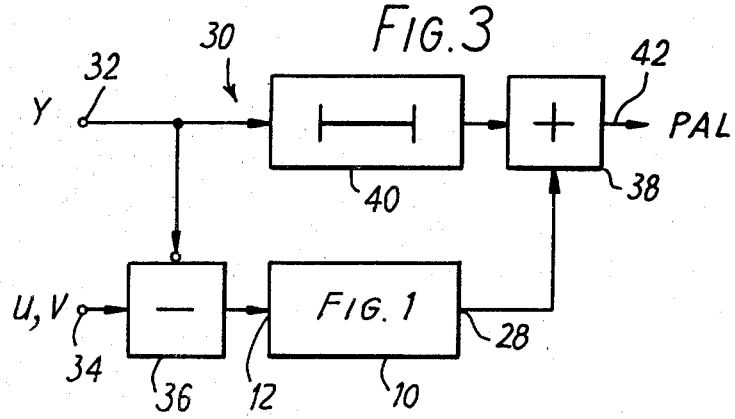

FIG.2
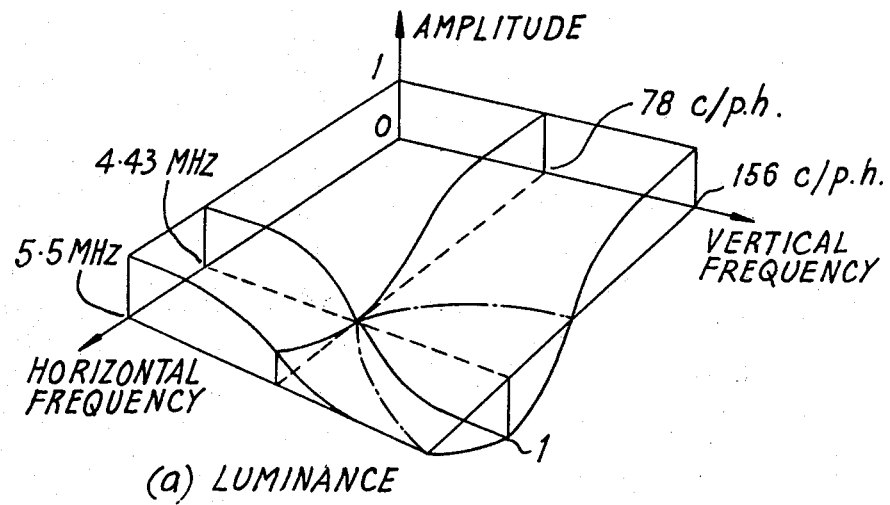
(a) LUMINANCE
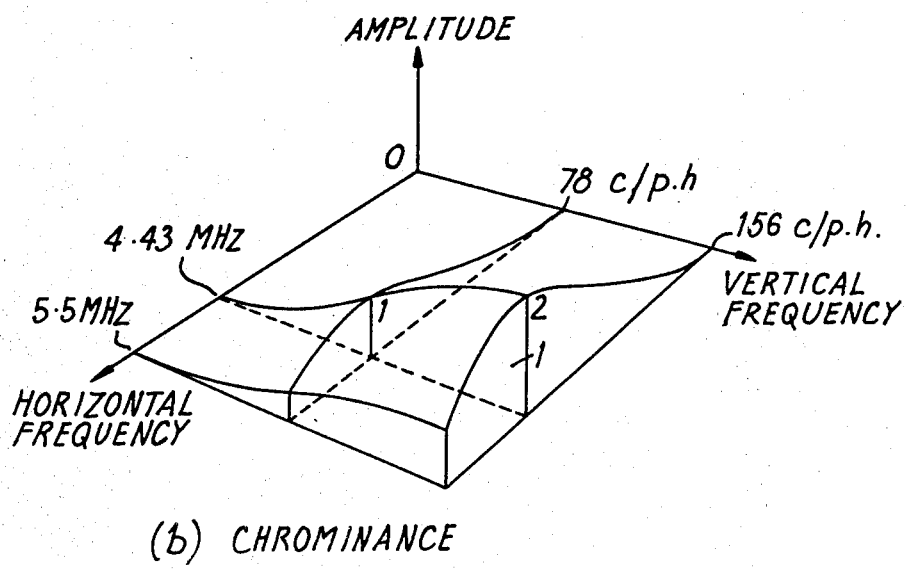
(b) CHROMINANCE

PROCESSING CIRCUIT FOR COLOR TELEVISION SIGNALS

This is a continuation of application Ser. No. 24,519, filed Mar. 28 1979, now abandoned.

BACKGROUND OF THE INVENTION

This invention relates to circuits for processing colour television signals in the PAL or N.T.S.C. system.

It is frequently desired to separate a composite PAL colour television signal into its luminance and chrominance components. The simplest methods involve only band-pass filters, but these are crude, introduce considerable cross-colour, and largely negate many of the advantages of the PAL system. One improved method is described in cognate British Patent Applications Nos. 22567/77 and 51668/77 (publised as German Offenlegungsschrift 28 22 668), which uses delays of one line plus or minus a quarter cycle of subcarrier. Another improved method is described in British Pat. No. 1,511,230 and developed in Brit. Pat. No. 1,524,749 and Application No. 15811/77. However these improved methods are, at least in general, inapplicable to processing systems which use line-locked sampling and furthermore require relatively complicated circuitry.

This invention enables the provision of a processing system in which line-locked sampling can be used, and which is of relatively uncomplicated construction. At the least, the invention provides a useful alternative to the previously known systems. Apart from separating a composite PAL signal into its luminance and chrominance components, the system may also be useful in filtering the luminance component of a PAL signal to remove componenets likely to cause cross-colour, or in filtering a combination of the luminance and chrominance components in a PAL coder.

SUMMARY OF THE INVENTION

According to this invention there is provided a signal processing circuit for processing colour television signals in the PAL or N.T.S.C. system, comprising an input terminal, means connected to the input signal for providing (i) a first signal being the input signal delayed by one line period and (ii) a second signal being the resultant of the average of the undelayed input signal and the input signal delayed by two line periods subtracted from the first signal, and means for band-pass filtering the second signal to provide a filtered signal, the filter pass-band comprising essentially the chrominance frequency band of the system.

Preferably means are provided for combining the first signal and the filtered signal such as to subtract chrominance components or components resembling them in the filtered signal from the said first signal, and a main output terminal is connected to the output of the combining means. A second output terminal may then be connected to the output of the filtering means. In this case, if a composite PAl or N.T.S.C. signal is applied to the input terminal, the luminance component will appear at the main output terminal and the chrominance component will appear at the second output terminal. In any given instance, only one of the outputs may be used.

BRIEF DESCRIPTION OF THE DRAWINGS

The invention will now be described in more detail, with reference to the accompanying drawings, in which:

FIG. 1 is a block circuit diagram of a processing circuit embodying the invention for use with PAL signals;

FIG. 2 shows at (a) the luminance and at (b) the chrominance characteristics of a filter of the type shown in FIG. 1 when supplied with a composite PAL signal;

FIG. 3 shows how the circuit of FIG. 1 can be incorporated into a PAL coder.

DETAILED DESCRIPTION OF THE PREFERRED EMBODIMENTS

Figure 4:
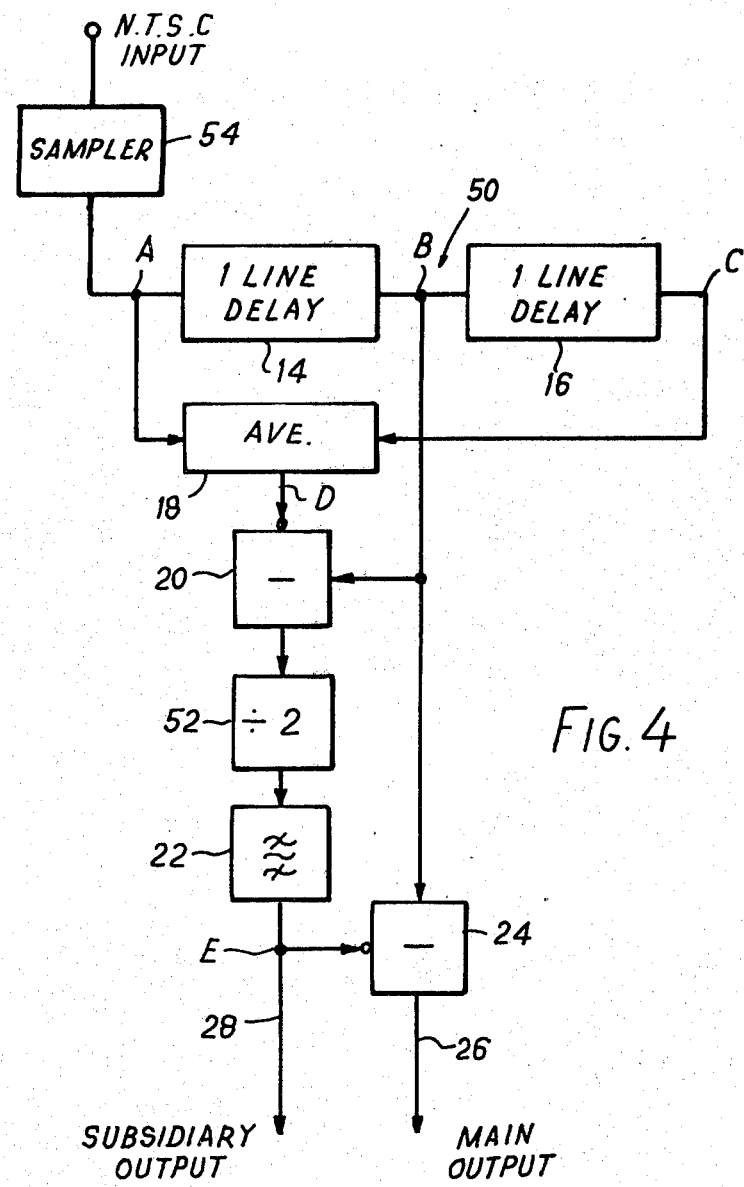
FIG. 4 is a block diagram of a circuit based on FIG. 1 for N.T.S.C. signals.

The processing circuit 10 of FIG. 1 has an input terminal 12 to which are connected two one-line delays 14 and 16 in series. An averaging circuit 18 conveniently formed of an adder and a divide-by-two circuit is connected both to the input terminal 12 and to the output of delay 16 to provide a signal representing the average of the undelayed input signal and the input signal delayed by two line periods. At the output of delay 14 is provided the input signal delayed by one line period.

A subtractor 20 has its inverting input connected to the output of the averaging circuit 18, and its non-inverting input connected to the output of the delay 14. It will be appreciated that the averaging circuit 18 and subtractor 20 can if desired be combined into a single three-input weighted adder, the weights being $-\frac{1}{2}, +1, -\frac{1}{2}$.

To the output of subtractor 20 is connected a bandpass filter 22 having a pass-band covering the chrominance frequency band. In the PAL system in use in the United Kingdom this extends from about 3.3 MHz to about 5.5 MHz. The output of the filter 22 is applied to the inverting input of a subtractor 24, the non-inverting input of which is connected to the output of the delay 14. The output 26 of the subtractor 24 constitutes the main output of the circuit, and the output 28 of the filter 22 will also frequently be used as a subsidiary output, as will be described.

The use of the circuit with a composite PAL signal applied to the input terminal will be described by considering separately the processing of chrominance components, of purely horizontal luminance components (such as formed by vertical bars), and of purely vertical luminance components (such as formed by horizontal bars). Reference will be made to the circuit junctions A, B, C, D and E shown on FIG. 1.

For an area of constant colour, the phase of the U and V subcarrier is reversed across the two delay lines, as between points A and C, by virtue of the properties of the PAL system, since in the PAL system the colour subcarrier frequency is approximately an odd integral multiple of one quarter of the line frequency. Thus the averager 18 produces zero output at point D, and the chrominance component from point B at the output of delay 14 passes through the subtractor 20 unaltered and after filtering in filter 22 is subtracted in subtractor 24 to leave no nett chrominance component in the luminance output at terminal 26. The chrominance component itself is available at terminal 28.

For luminance components containing horizontal frequencies, the signals at A, B, C and D are all equal, there being no difference between adjacent lines. Therefore the signals at points D and B cancel out in the subtractor 20. Thus no luminance component reaches the band-pass filter 22. Since there is no signal at point E, the luminance component from point B is passed directly to the luminance output 26.

Luminance components containing purely vertical frequencies are unable to pass the band-pass filter 22, and likewise do not appear at point E.

It is thus seen that input signal is separated into a luminance component appearing at the output 26 and a chrominance component appearing at the output 28. It is impossible to separate the luminance and chrominance completely because the two spectra overlap. However, we have found that with the circuit described subjectively good separation is obtained.

The frequency responses to the circuit of FIG. 1 to the luminance and chrominance components are shown respectively at (a) and (b) in FIG. 2. The diagrams show 3-dimensional plots of transmitted amplitude as against both horizontal frequency (in MHz) and vertical frequency (in cycles per picture height; c/p.h.).

For the luminance output the response falls to zero at the chrominance subcarrier frequency of 4.43 MHz and at 78 c/p.h. It is seen that some of the high frequency diagonal luminance is inverted.

For the chrominance output the response is unity at 4.43 MHz and 78 c/p.h. The vertical frequency response at the horizontal subcarrier frequency is anti-symmetrical about the vertical subcarrier frequency. Because of this, there will be no loss of vertical resolution in the demodulated U and V signal since any loss in the lower sideband is countered by a gain in the upper sideband. However, the anti-symmetric response will cause cross-talk between U and V on vertical colour changes. Because the cross-talk components will be modulated by the PAL switch, their effects can be reduced by vertical low-pass filtering of the demodulated U and V signals, although this will cause some loss of vertical resolution.

The chrominance and luminance separation filter 10 illustrated in FIG. 1 shows good separation of chrominance and luminance whilst maintaining the vertical chrominance resolution. The filter could be implemented as either an analogue circuit or digitally, using line-locked sampling. The digital implementation can be straightforward, since, apart from the horizontal chrominance filter, only simple arithmetic operations are involved.

The circuit of FIG. 1 can be used to "clean-up" a luminance signal alone before processing in situations where cross-talk is likely to arise. For this purpose output 28 is not used.

FIG. 3 shows the use of the circuit of FIG. 1 in a PAL coder. The coder 30 of FIG. 3 has an input 32 for receiving a luminance signal and an input 34 for receiving a chrominance signal. The luminance signal is subtracted from the chrominance signal in a subtractor 36 and the resultant applied to the input 12 of the circuit 10 of FIG. 1. An adder 38 receives the output 28 from the circuit 10 and also the luminance signal from input 32 after passage through a compensating delay 40, and provides as encoded PAL signal at an output 42. As only the output 28 is used, the subtractor 24 can be omitted from the circuit 10 of FIG. 1.

The operation of the circuit of FIG. 3 is as follows. The modulated U and V subcarrier signals pass through the subtractor 36 to input 12 of FIG. 1, the circuit of which operates as a two-dimensional chrominance band-pass filter. At output 28, the chrominance signal corresponding to an area of constant colour is unattenuated, but chrominance sidebands are shaped by the characteristic of FIG. 2(b). This tends to exclude chrominance that would be interpreted as luminance at the decoder. The remaining chrominance is added to the luminance signal Y in adder 38 to form the composite PAL signal.

The circuit 10 also affects the Y signal applied at input 32. The effect of the subtractor 36 is to invert the Y signal which then passes to the chrominance band-pass filter of FIG. 1. Any luminance signals that appear at output 28 are those which would be interpreted incorrectly as chrominance at the decoder. Since these signals have been inverted, they cancel the unwanted components when combined by adder 38 with the direct luminance signal passing through the compensating delay 40.

Therefore, the effect of FIG. 3 is to remove at the coder many of the components that would cause cross-colour and cross luminance in the decoded signals.

The apparatus is particularly suited for use with PAL signals, although it can be adapted for use with N.T.S.C. signals. For use with N.T.S.C. signals, the circuit of FIG. 1 is modified to give the processing circuit 50 shown in FIG. 4, by the addition of a divide-by-two circuit 52 between the subtractor 20 and the junction E, either before or after the band-pass filter 22, and alteration of the band-pass filter to be centred on the correct colour subcarrier frequency, e.g. 3.58 MHz for a conventional 525/60 system. It is assumed that digital signals are being processed as indicated by the inclusion of a digital sampler 54 which samples at a line-locked sample rate. In other respects the circuit is the same as FIG. 1.

I claim:

1. A signal processing circuit for processing an input signal in a PAL colour television system, comprising:
    an input terminal adapted to receive a PAL system input signal;
    means connected to the input terminal and responsive to said input signal for providing (i) a first signal being the input signal delayed by one line period and (ii) a second signal being the resultant of the average of the delayed input signal and the input signal delayed by two line periods, which average predominantly comprises luminance, subtracted from the first signal, which second signal predominantly comprises chrominance;
    means for band-pass filtering the second signal to provide a filtered signal, the filter pass-band comprising essentially the PAL chrominance frequency band; and
    means for combining the filtered signal with the first signal at the same relative amplitude to provide a luminance signal in which comb filtering action is confined to the chrominance frequency band.

2. A signal processing circuit according to claim 1, in which the combining means is adapted to combine the said first signal and the filtered signal such as to subtract chrominance components or components resembling them in the filtered signal from the first signal, and further including a main output terminal connected to the output of the combining means.

3. A signal processing circuit according to claim 1 or 2, further including digital sampling means for sampling the input signal at a sampling rate which is an integral multiple of the line frequency of said PAL system.

4. A method of processing an input signal in a PAL colour television system, comprising:

delaying said PAL input signal by one line period to provide a first signal;

providing a second signal which is the resultant of the average of the undelayed PAL input signal and the PAL input signal delayed by two line periods, which average predominantly comprises luminance, subtracted from the first signal, which second signal predominantly comprises chrominance;

band-pass filtering the second signal to provide a filtered signal with a pass-band comprising essentially the PAL chrominance frequency band; and combining the filtered signal with a luminance signal at the same relative amplitude to provide a luminance signal in which comb filtering action is confined to the chrominance frequency band.

5. A method according to claim 4 in which the said luminance signal comprises the said first signal.

6. A method according to claim 4 or 5 in which the input signal is sampled at a sample rate which is integral multiple of the line frequency.

7. A signal processing circuit for processing an input signal in a PAL colour television system, comprising:

an input terminal adapted to receive a PAL system input signal;

means connected to the input terminal and responsive to said input signal for providing (i) a first signal being the input signal delayed by one line period, and (ii) a second signal being the resultant of the average of the undelayed input signal and the input signal delayed by two line periods, which average predominantly comprises luminance, subtracted from the first signal, which second signal predominantly comprises chrominance;

means for band-pass filtering the second signal to provide a filtered signal, the filter pass band comprising essentially the PAL chrominance frequency band;

means for band-passing filtering the second signal to provide a filtered signal, the filter pass-band comprising essentially the PAL chrominance frequency band;

means for combining the filtered signal with a luminance signal at the same relative amplitude, which luminance signal has been delayed by a delay which compensates for the delay introduced by said circuit to provide a luminance signal in which comb filtering action is combined to the chrominance frequency band.

* * * * *